(12) United States Patent
Nickell et al.

(10) Patent No.: US 7,669,188 B2
(45) Date of Patent: Feb. 23, 2010

(54) SYSTEM AND METHOD FOR IDENTIFYING VIABLE REFACTORINGS OF PROGRAM CODE USING A COMPREHENSIVE TEST SUITE

(75) Inventors: Eric Stephen Nickell, Los Gatos, CA (US); Ian E. Smith, Seattle, WA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 927 days.

(21) Appl. No.: 11/003,254

(22) Filed: Dec. 3, 2004

(65) Prior Publication Data

US 2006/0123394 A1 Jun. 8, 2006

(51) Int. Cl.
*G06F 9/44* (2006.01)
*G06F 9/45* (2006.01)
*G06F 11/00* (2006.01)

(52) U.S. Cl. .................. 717/126; 717/125; 717/137; 714/19; 714/38

(58) Field of Classification Search .................. 717/124
See application file for complete search history.

(56) References Cited

U.S. PATENT DOCUMENTS 5,673,387 A * 9/1997 Chen et al. .................... 714/38
5,974,255 A * 10/1999 Gossain et al. ............... 717/124
6,002,869 A * 12/1999 Hinckley .................... 717/124
6,502,102 B1 * 12/2002 Haswell et al. .............. 707/102
6,807,548 B1 * 10/2004 Kemper .................. 707/103 R

OTHER PUBLICATIONS

Li et al., "Tool support for refactoring functional programs" Aug. 2003, ACM, Haskell '03: Proceedings of the 2003 ACM SIGPLAN workshop on Haskell.*
Streckenbach et al. "Refactoring class hierarchies with Kaba" Oct. 2004, ACM, ACM SIGPLAN Notices, vol. 39 Issue 10.*
M. Fowler, "Refactoring Improving The Design Of Existing Code," Chs. 6-12, Addison-Wesley (1999).

* cited by examiner

*Primary Examiner*—James Rutten
(74) *Attorney, Agent, or Firm*—Patrick J.S. Inouye; Krista A. Wittman

(57) ABSTRACT

A system and method for identifying viable refactorings of program code using a comprehensive test suite is presented. Program code is maintained, including program statements written in accordance with a programming language and defining operations executed following transformation into machine code. A test suite associated with the program code is specified and includes one or more additional program operations to determine satisfactory generation of expected results during the operations execution. A plurality of refactorings are speculatively applied to the program code by evaluating one or more of the program statements against a set of refactoring rules and restructuring the program statements pursuant to at least one refactoring rule. The test suite is executed against the program code following each restructuring of the program statements and each refactoring that passes the test suite is determined.

21 Claims, 8 Drawing Sheets

40

```
string key = tok.next ();
if (key.equals ("DESC") ) {something ( );}
     •
     •
     •
string key = tok.next ();
if (key.equals (foo ( ) ) ) {something ( );}
     •
     •
     •
```

```
string key = tok.next ( );
string temp1 = "DESC";
if (key.equals (temp1) ) {something ( );}
     •
     •
     •
string key = tok.next ( );
string temp1 = foo ( );
if (key.equals (temp1) ) {something ( );}
     •
     •
     •
```

```
string temp1 = "DESC";
string key = tok.next ( );
if (key.equals (temp1) ) {something ( );}
        .
        .
        .
string temp1 = foo ( );
string key = tok.next ( );
if (key.equals (temp1 ) ) {something ( );}
        .
        .
        .
```

```
void parseblock (InputStream in) {
        .
        .
        .
    Token t1 = in.getToken ( );
    requireTokenBe ( ' { ');
        .
        .
        .
    Token t2 = in.getToken ( );
    requireTokenBe ( ' } ');
        .
        .
        .
```

```
void parseblock (InputStream in) {
    •
    •
    •
    Token temp = in.getToken ( );
    Token t1 = temp;
    requireTokenBe ( ' { ' );
    •
    •
    •
    Token t2 = temp;
    requireTokenBe ( ' } ' );
    •
    •
    •
```

FIG. 8

SYSTEM AND METHOD FOR IDENTIFYING VIABLE REFACTORINGS OF PROGRAM CODE USING A COMPREHENSIVE TEST SUITE

FIELD

This application relates in general to program code refactoring and, in particular, to a system and method for identifying viable refactorings of program code using a comprehensive test suite.

BACKGROUND

Commercial software development is a maturing discipline, which has historically been characterized by divergent approaches to design, coding, testing, and maintenance. Extreme programming, one of several emerging, so-called "agile methodologies," attempts to unify the software development cycle into a holistic process to improve code quality and product viability, such as described in K. Beck, "Extreme Programming Explained: Embrace Change," Addison-Wesley (2000), the disclosure of which is incorporated by reference. Extreme programming is practiced through simple design, small releases, metaphors, testing, refactoring, pair programming, and continuous integration.

Refactoring is an inherent part of extreme programming and has been adopted to facilitate the process of adding features to existing program code. Refactoring, however, is not exclusive to extreme programming and can be applied to other software development methodologies. Refactoring is defined as the process of changing software such that the changes do not alter the external behavior of the code, yet improve the internal code structure. As a result, refactoring improves code design after the code has been written by removing duplication, improving communication, simplifying structure, and adding flexibility.

Testing is also an inherent part of extreme programming, which divides testing into two categories. First, programmer or unit tests are written and maintained as part of the development activity in the same programming language as the code. Unit tests are integrated at the class level, preferably independently of each other and test the classes to verify complicated functionality and unusual circumstances. Unit tests also document code by explicitly indicating what results should be expected for typical cases. Second, user or acceptance tests evaluate the functionality of an entire system, generally as specified by a customer or end user. Acceptance are typically written in a scripting language or in the same programming language as the code to check the overall functionality of the program by treating the code as a black box and omitting specific knowledge of system internals. Acceptance tests touch at application programming and graphical user interfaces to apply domain-specific data. When properly written, unit tests and acceptance tests can form comprehensive test suites that can dynamically verify program correctness at runtime. As well, either unit tests or acceptance tests can, by themselves, be considered comprehensive when each point of functionality has a set of covering tests, which ensure correct functioning and show some resistance to easily foreseen faults.

In contrast, refactoring is static activity that is conventionally applied to code as a structured, yet subjective methodology. In the general case, refactoring is as creative a process as the development of original program code. The critical points that distinguish general programming and refactoring are that: (1) the needed functionality is not changed as the result of the software changing, and (2) the software is improved in some way, such as being smaller, simpler, or made amenable to a subsequent development. Although refactoring can be applied to all forms of structured program code, refactoring is most effectively applied to object oriented code, preferably within the context of a testing framework. Refactoring can involve selecting and restructuring code according to well-accepted refactoring rules, such as listed in the catalogue of refactoring rules described in M. Fowler, "Refactoring Improving The Design Of Existing Code," Chs. 6-12, Addison-Wesley (1999), the disclosure of which is incorporated by reference. The validity of refactoring rules can be determined through testing or semantic proofs, which can also be subject to assumptions regarding the code.

Ideally, refactoring should be applied as a continuous process integral to the overall software development cycle. Identifying opportunities within code to apply refactoring is nevertheless subjective and relatively ad hoc, involving visual inspection and manual rewritings of code. Moreover, the set of refactoring rules chosen tends to be highly dependent upon the experience and preferences of the developers involved. Consequently, automated refactoring methodologies generally are conservative and apply only to those refactorings, which can be proven semantically correct, or can be proven semantically correct after making certain assumptions. Thus, the code is only evaluated within the context of literal class definitions and runtime constraints and other factors placed on the code in the dynamic environment are ignored during refactoring selection. In addition, automated refactoring methodologies require human initiation, often through the use of an integrated development environment. As a result, code refactored through automated methodologies often remains suitable for further refactoring.

Therefore, there is a need for an approach to providing automated identification of a range of useable refactorings for code determined within a static and dynamic context. Preferably, such an approach would allow a wider range of refactorings than only those refactorings proven semantically correct and would apply comprehensive testing to validate the program correctness.

SUMMARY

One embodiment provides a system and method for identifying viable refactorings of program code using a comprehensive test suite. Program code is maintained, including program statements written in accordance with a programming language and defining operations executed following transformation into machine code. A test suite associated with the program code is specified and includes one or more additional program operations to determine satisfactory generation of expected results during the operations execution. A plurality of refactorings are speculatively applied to the program code by evaluating one or more of the program statements against a set of refactoring rules restructuring the program statements pursuant to at least one refactoring rule. The test suite is executed against the program code following each restructuring of the program statements and each refactoring that passes the test suite is determined.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the

BRIEF DESCRIPTION OF THE DRAWINGS

FIGS. 4-8 are block diagrams showing, by way of example, pseudo code for a series of refactorings.

DETAILED DESCRIPTION

Development Environment

Figure 1:
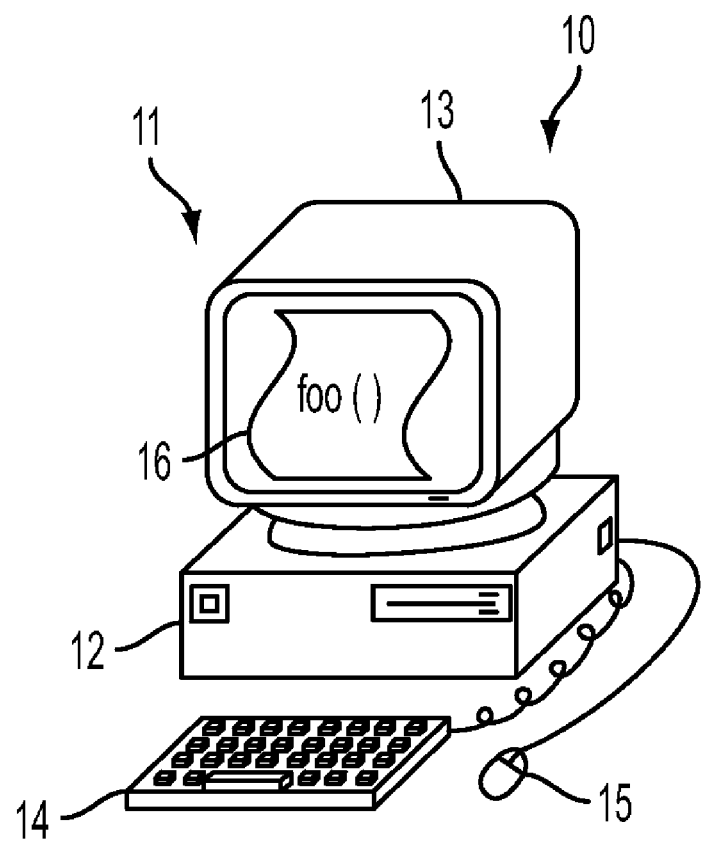
FIG. 1 is a block diagram showing, by way of example, a development workstation upon which to execute automated refactorings.

FIG. 1 is a block diagram 10 showing, by way of example, a development workstation 11 upon which to execute automated refactorings. Program code 16 is written in accordance with the programming language on a development platform 11 and is refactored through a refactoring engine, as further described below with reference to FIG. 3.

Preferably, the development platform 11 is a general-purpose computer executing an operating system and providing an application development environment. The development platform 11 includes components conventionally found in a personal computer, such as, for example, a central processing unit (CPU) 12, display 13, keyboard 14, mouse 15, and various components for interconnecting these elements. Further user interfacing means for inputting and displaying information from and to a human developer could also be provided. Program code, including software programs, and data is loaded into memory for execution and processing by the CPU and results are generated for display, output, transmittal, or storage.

Process Flow

Figure 2:
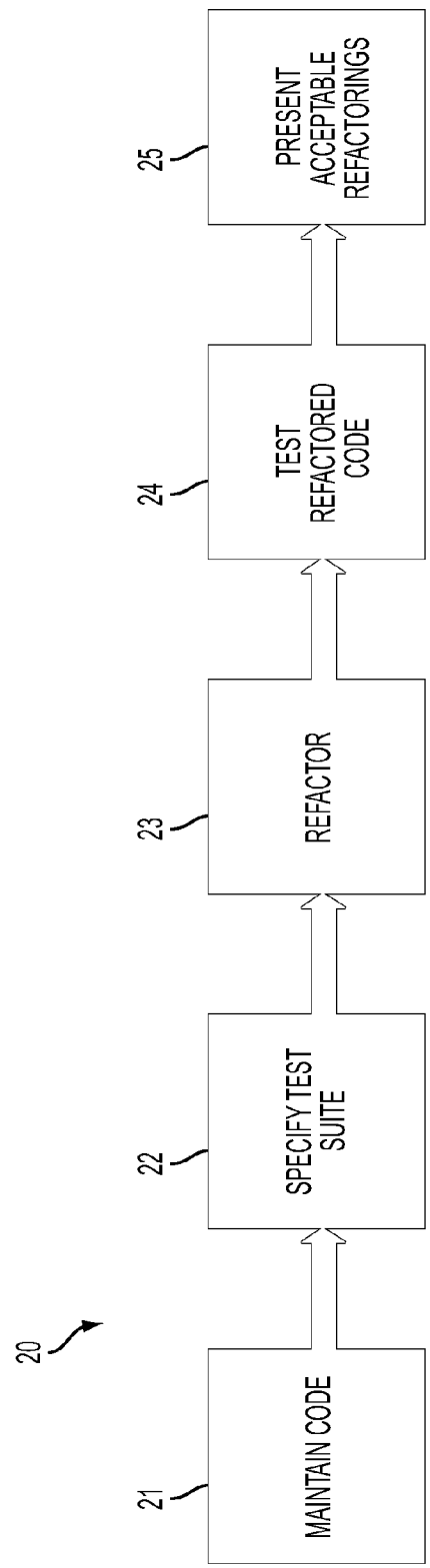
FIG. 2 is a process flow diagram showing the identification of viable refactorings of program code using a comprehensive test suite in accordance with one embodiment.

FIG. 2 is a process flow diagram 20 showing the identification of viable refactorings of program code 16 using a comprehensive test suite in accordance with one embodiment. Processing occurs in five stages. Initially, the program code 16 is maintained (operation 21), generally as part of a software development project by a team of developers, who design, code, test and maintain the program code 16 within an integrated development environment. As an integral part of code design, the developers specify a comprehensive test suite (operation 22) that provides verification of correct program execution. Throughout the development process, the program code is speculatively refactored (operation 23) by applying one or more refactoring rules to restructure the program code 16 without affecting external behavior. During refactoring, the refactored code is continually tested (operation 24) using the comprehensive test suite, which verifies that the proposed refactorings do not alter the external behavior of the program code 16 as specified by the comprehensive test suite. Lastly, acceptable refactorings may be periodically presented to the developers (operation 25).

Software Modules

Figure 3:
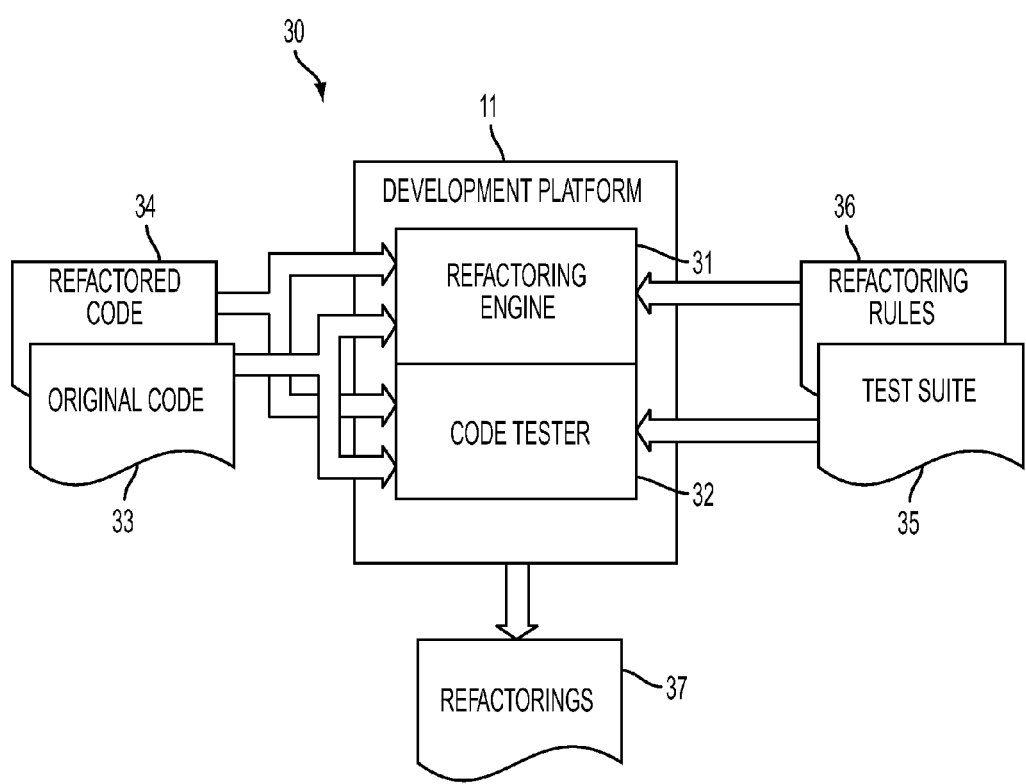
FIG. 3 is a functional block diagram showing software modules for identifying viable refactorings of program code, such as used in the system of FIG. 1.

FIG. 3 is a functional block diagram 30 showing software modules for identifying viable refactorings of program code 16, such as used in the system of FIG. 1. The development platform 11 includes a refactoring engine 31 and code tester 32. The refactoring engine 31 applies refactorings by selecting one or more rules from a set of refactoring rules 36 to original program code 33. The refactoring rules 36 specify improvements to the internal structure of the code without changing the external behavior of the code during execution. The refactoring rules 36 can be selected from a catalogue, such as described in M. Fowler, supra., and can also include other refactoring rules specified by the developers, including individual refactorings, which can be proven semantically correct or testably correct, or compound refactorings, such as described in commonly-assigned U.S. Pat. No. 7,451,439, issued Nov. 11, 2008, to Nickell et al., the disclosure of which is incorporated by reference. The refactoring engine 31 generates refactored code 34 after the application of each refactoring rule 36. The refactored code 34 can include one or more refactorings, which each can include the application of one or more of the refactoring rules 36.

The code tester 32 tests the refactored code 34 to ensure program correctness using a comprehensive test suite 35. The test suite 35 must be sufficient to subjectively satisfy the developers and can include unit tests, acceptance tests, or a combination of tests. Critically, the test suite 35 must be in an executable form to enable automated correctness testing, yet not be limited to ensuring only syntactic correctness. The code tester 32 determines that each of the refactorings applied to the original code 33 is acceptable if the refactored code 34 passes the test suite 35. Those refactorings 37 that pass the test suite 35 may be presented to the developers. In addition, there may be other criteria for determining whether a refactoring should be presented to developers, as well as whether the refactoring is valid.

REFACTORING EXAMPLES

FIGS. 4-8 are block diagrams showing, by way of example, pseudo code for a series of refactorings.

Figure 9:
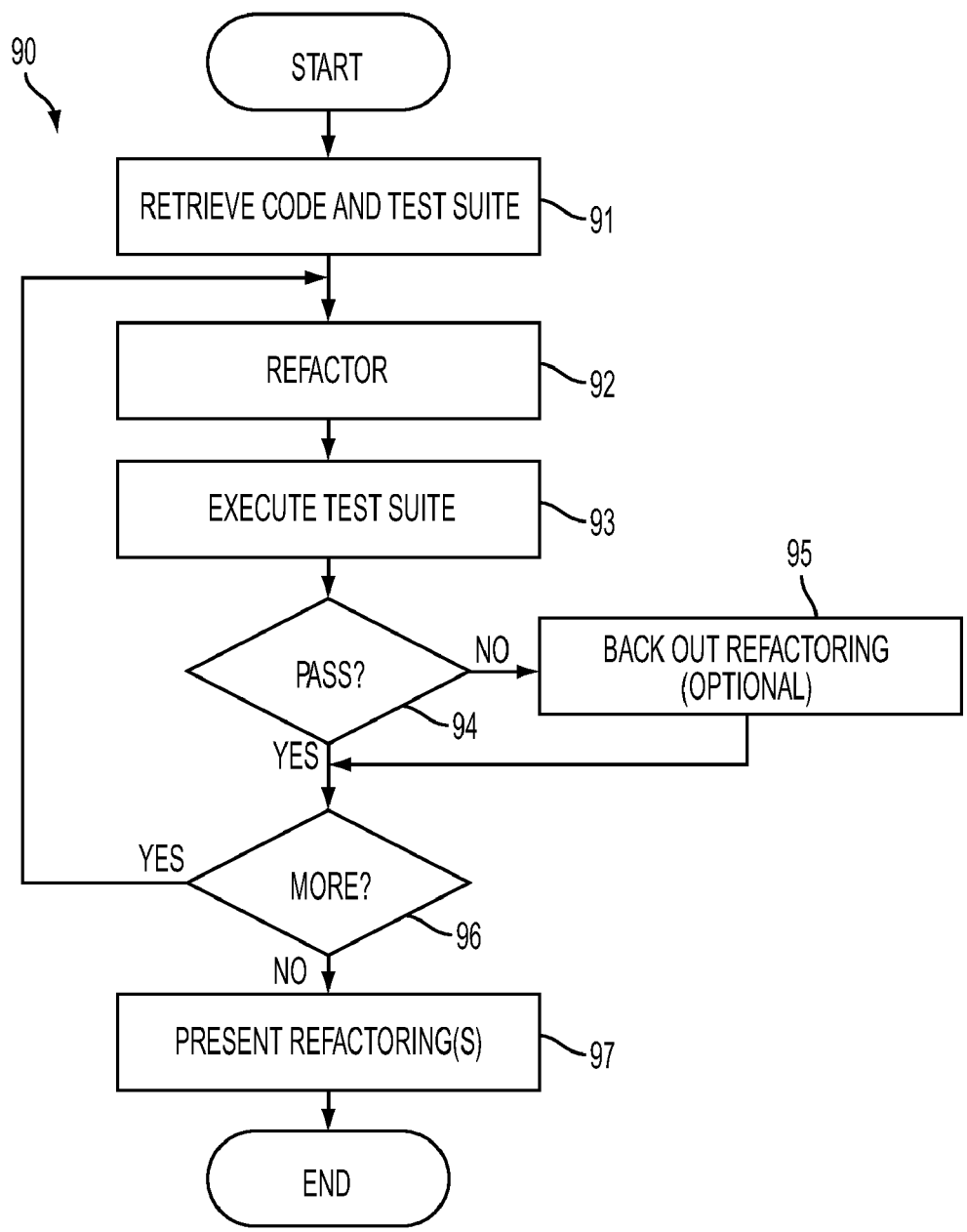
FIG. 9 is a flow diagram showing a method for identifying viable refactorings of program code using a comprehensive test suite, in accordance with one embodiment.

FIG. 9 is a flow diagram showing a method for identifying viable refactoring of program code using a comprehensive test suite, in accordance with one embodiment. Referring first to FIGS. 4-6, a syntactically correct but testably incorrect refactoring that can be speculatively applied is shown. Referring initially to FIG. 4, an original code segment 40 is shown and includes two non-parametered conditional statements, if (key.equals("DESC")) {something( );} and if (key.equals ("DESC")) {something( );}, that represent potentially duplicated code. Referring next to FIG. 5, a first refactored code segment 50 is shown. The pair of conditional statements have been refactored by removing the conditional test values into separate assignment statements, string temp1="DESC"; and string temp1=foo( ), and replacing the test values by the local variable temp1. Referring finally to FIG. 6, a second refactored code segment 60 is shown. The pair of assignment statements, string key=tok.next( ), has been "bubbled" downwards, attempting to increase the number of sequential identical statements the two code fragments have in common.

While syntactically correct, the validity of this refactoring cannot be determined unless verified by testing or by programmer inspection because the reordering of the calls to foo ( ) and tok.next( ) may or may not be valid. The refactoring might be invalid, for example, if the method foo( ) itself accesses or changes the state of the token input stream. This refactoring would be identified as improper upon execution of the comprehensive test suite 35 and would be backed out of the refactored code.

Referring next to FIGS. 7-8, a second example of a syntactically correct but testably incorrect refactoring that can also be speculatively applied is shown. Referring initially to FIG. 7, an original code segment 70 is shown and includes a pair of assignment statements, Token t1=in.getToken( ), that receive values through a call on a method in.getToken( ) that reads an input stream in. Superficially, the assignment statements appear to constitute duplicated code. Referring next to FIG. 8, a refactored code segment 80 is shown. The pair of assignment statements have been refactored by replacing the calls on the input stream method in.getToken( ) with a local variable temp. In addition, the method call in.getToken( ) has been bubbled upwards and introduced in a new assignment statement, Token temp=in.getToken( ). While also syntactically correct, this refactoring is improper because the constraints on the ordering of calls on the input stream method call in.getToken( ) are ignored. This refactoring would also be identified as improper upon execution of the comprehensive test suite 35 and would be backed out of the refactored code.

Method

FIG. 9 is a flow diagram 90 showing a method for identifying viable refactorings of program code 16 using a comprehensive test suite 35, in accordance with one embodiment. The purpose of the method is to speculatively refactor and test program code against a comprehensive test suite 35 to identify those refactorings, which are correct and viable and, therefore, worthy for presenting to developers working in an automated refactoring environment, depending on other criteria. The method is described as a sequence of process operations or steps, which can be executed, for instance, by a development platform 11.

Initially, the original program code 33 to be refactored and the test suite 35 are retrieved (block 91). In one embodiment, the program code 33 is written in an object-oriented programming language in conjunction with a framework that supports unit testing. In a further embodiment, the test suite 35 specifies acceptance tests written in a scripting language that can be executed against the refactored code 34. The program code 16 is then speculatively refactored (block 92) by applying one or more refactorings through an automated process with each refactoring requiring the application of one or more refactoring rules 36. The test suite 35 is executed against the refactored code (block 93) following one or more refactorings. If the refactored code does not successfully pass the execution of the test suite 35 (block 94), the refactoring can optionally be backed out of the program code 16 (block 95) or left in, if the refactoring is performed on a copy of the program code 16. Otherwise, the refactoring is acceptable. Further refactorings could be speculatively applied (block 96) and, upon completion of the last refactoring, the refactorings are presented to the developers (block 97).

While the invention has been particularly shown and described as referenced to the embodiments thereof, those skilled in the art will understand that the foregoing and other changes in form and detail may be made therein without departing from the spirit and scope.

Figure 10:
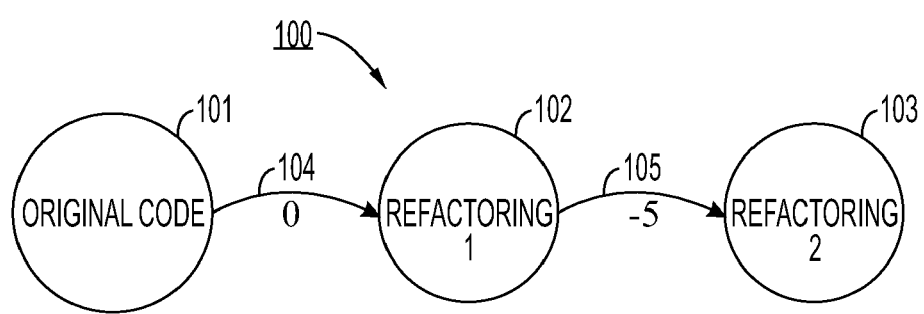
FIG. 10 is a graph diagram 100 showing, by way of example, constituent refactorings for a candidate compound refactoring as depicted in a logically-defined graphical search space.

Referring next to FIG. 10, the states of the original code segment 40 and the first refactored code segment 50 are respectively shown as nodes 101, 102 in a logically defined graphical search space. The relative difference between the states of the original code segment 40 and the refactored code segment 50 are represented as a weight assigned to a directed edge 104 from node 101 to node 102. The weight reflects the improvement, degradation, or status quo of the first refactoring. The state of the second refactored code segment 60 is shown as node 103. The relative difference between the states of the first refactored code segment 50 and the second refactored code segment 60 is represented as a weight assigned to a directed edge 105 from node 102 to node 103.

The relative differences, as reflected in the assigned weights, reflect quantitative metrics, which are used to quantitatively measure the actual and potential differences of the original code 33 and refactored code 34. The search space is progressively built with each successive application of a refactoring 37 and the relative differences can be cumulatively accrued on a per-refactoring basis or aggregated upon completion of a series of refactorings, such as may occur when no further refactorings can be found for the program code. The quantitative metrics can be applied as a threshold for presentation of a refactoring 37 to developers or to determine which of two or more refactorings 37 has a higher priority for presentation to developers. In addition, quantitative metrics can reflect the potential of a refactoring 37 for use in a further refactoring. Other types of quantitative metrics and graphical representations are possible.

What is claimed is:

1. A system for identifying viable refactorings of program code using a comprehensive test suite, comprising:
    a memory configured to store data comprising:
        original program code comprising program statements written in accordance with a programming language and defining operations executed following transformation into machine code;
        a test suite associated with the original program code and comprising one or more additional operations and expected results;
    a refactoring engine, comprising:
        a selection module configured to select a set of refactoring rules and to automatically apply refactorings to the original program code; and
        an evaluation module configured to evaluate one or more of the program statements in the original program code against the refactoring rules and to restructure the program statements pursuant to the one such refactoring rule from the refactoring rule set; and
    a code tester comprising:
        a test execution module configured to execute the additional program operations against the program statements as restructured;
        a comparison module configured to compare actual results from the original program operations' execution against the expected results;
        a reversion module configured to revert upon unsatisfactory comparison the restructured program statements to the original program statements and to select another such refactoring rule from the refactoring rule set for automatic application to the original program code; and
        a conversion module configured to save upon satisfactory comparison the restructured program statements to the original program statements and to select another such refactoring rule from the refactoring rule set for automatic application to the original program code, wherein the refactorings resulting in satisfactory comparison of the actual results to the expected results are assigned weightings quantifying the amount of difference between the original program statements and the restructured program statements and are exposed based on the weightings to a developer through a user interface.

2. A system according to claim 1, wherein the test suite comprises unit tests associated with specific program statements collectively performing a related task.

3. A system according to claim 2, wherein the unit tests comprise program statements written in accordance with the programming language.

4. A system according to claim 1, wherein the test suite comprises an acceptance test associated with the program code overall.

5. A system according to claim 4, wherein the acceptance test comprises program statements written in accordance with a scripting language.

6. A system according to claim 1, wherein the refactoring engine selects the refactoring rules set from the group of refactorings comprising provably valid refactorings, provably valid refactorings subject to assumptions and testably valid refactorings.

7. A system according to claim 1, wherein the refactorings are integrated through a framework defining testing functionality and comprising program statements written in accordance with the programming language.

8. A system according to claim 1, wherein the refactorings resulting in satisfactory comparison of actual results to expected results are exposed through a user interface.

9. A system according to claim 1, wherein the programming language comprises an object oriented programming language.

10. A system according to claim 9, wherein a test class is provided for each class in the program code.

11. A method for identifying viable refactorings of program code using a comprehensive test suite executing on a processor and memory, comprising:
maintaining original program code comprising program statements written in accordance with a programming language and defining operations executed following transformation into machine code;
specifying a test suite associated with the original program code and comprising one or more additional program operations and expected results;
automatically applying refactorings to the original program code, comprising:
selecting a set of refactoring rules;
evaluating one or more of the program statements in the original program code against one such refactoring rule from the refactoring rule set;
restructuring the program statements pursuant to the one such refactoring rule;
executing the additional program operations against the program statements as restructured;
comparing actual results from the additional program operations' execution against the expected results;
upon unsatisfactory comparison, reverting the restructured program statements to the original program statements and selecting another such refactoring rule from the refactoring rule set for automatic application to the original program code; and
upon satisfactory comparison, saving the restructured program statements to the original program code and selecting another such refactoring rule from the refactoring rule set for automatic application to the original program code, wherein the refactorings resulting in satisfactory comparison of the actual results to the expected results are assigned weightings quantifying the amount of difference between the original program statements and the restructured program statements and are exposed based on the weightings to a developer through a user interface.

12. A method according to claim 11, wherein the test suite comprises unit tests associated with specific program statements collectively performing a related task.

13. A method according to claim 12, wherein the unit tests comprise program statements written in accordance with the programming language.

14. A method according to claim 11, wherein the test suite comprises an acceptance test associated with the program code overall.

15. A method according to claim 14, wherein the acceptance test comprises program statements written in accordance with a scripting language.

16. A method according to claim 11, further comprising:
selecting the refactoring rules set from the group of refactorings comprising provably valid refactorings, provably valid refactorings subject to assumptions and testably valid refactorings.

17. A method according to claim 11, further comprising:
integrating the refactorings through a framework defining testing functionality and comprising program statements written in accordance with the programming language.

18. A method according to claim 11, further comprising:
exposing the refactorings resulting in satisfactory comparison of actual results to expected results through a user interface.

19. A method according to claim 11, wherein the programming language comprises an object oriented programming language.

20. A method according to claim 19, further comprising:
providing a test class for each class in the program code.

21. A computer-readable storage medium holding code for performing the method according to claim 11.

* * * * *